United States Patent
Mogensen et al.

(10) Patent No.: US 9,790,971 B2
(45) Date of Patent: Oct. 17, 2017

(54) PUMP CONTROL METHOD (71) Applicant: GRUNDFOS HOLDING A/S, Bjerringbro (DK)

(72) Inventors: Niels Mogensen, Viborg (DK); Carsten Skovmose Kallesøe, Viborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 14/719,874

(22) Filed: May 22, 2015

(65) Prior Publication Data
US 2015/0337876 A1 Nov. 26, 2015

(30) Foreign Application Priority Data

May 23, 2014 (EP) ..................... 14169568

(51) Int. Cl.
*F15B 21/00* (2006.01)
*F04D 13/12* (2006.01)
(Continued)

(52) U.S. Cl.
CPC ............. *F15B 21/00* (2013.01); *F04D 13/12* (2013.01); *F04D 15/0066* (2013.01);
(Continued)

(58) Field of Classification Search
CPC .. F04D 13/12; F04D 15/0066; F04D 15/0281; F15B 21/00; Y10T 137/0318; Y10T 137/86131; G05B 13/021
See application file for complete search history.

(56) References Cited

U.S. PATENT DOCUMENTS

2009/0287357 A1* 11/2009 Scoleri ................ F04B 23/08
700/282
2009/0304521 A1* 12/2009 Kernan .............. G05B 13/0205
417/2
(Continued)

FOREIGN PATENT DOCUMENTS

EP 2 476 907 A1 7/2012
EP 2 610 693 A1 7/2013
(Continued)

*Primary Examiner* — Miranda Huang
*Assistant Examiner* — John Park
(74) *Attorney, Agent, or Firm* — McGlew and Tuttle, P.C.

(57) ABSTRACT

The invention relates to a pump control method for the control of the operation of a pump system with at least two pump assemblies (2) which are arranged parallel or in series to one another. The method includes determining a specific total power $E_S$ of the complete pump system which defines a total power in relation to a hydraulic total load of the complete pump system, determining a specific individual power $E_{P,n}$ of each pump assembly (2) which defines an individual power in relation to the individual hydraulic load of the respective pump assembly (2), computing an individual load factor $E_{gain,n}$ for each pump assembly (2) according to the equation $$E_{gain,n} = \frac{E_S}{E_{P,n}}$$

and adapting the individual hydraulic load ($Q_n$; $H_n$) of the pump assemblies (2) in dependence on a desired hydraulic load ($Q_D$; $H_D$) as well as on the individual load factor $E_{gain,n}$ of the respective pump assembly (2).

18 Claims, 3 Drawing Sheets

(51) Int. Cl.
  *F04D 15/00* (2006.01)
  *F04D 15/02* (2006.01)
  *G05B 13/02* (2006.01)

(52) U.S. Cl.
  CPC ....... *F04D 15/0281* (2013.01); *G05B 13/021* (2013.01); *Y10T 137/0318* (2015.04); *Y10T 137/86131* (2015.04)

(56) References Cited

U.S. PATENT DOCUMENTS

| | | |
|---|---|---|
| 2011/0176933 A1 | 7/2011 | Kallesøe et al. |
| 2013/0108473 A1* | 5/2013 | Tamminen .............. F04B 49/00 417/3 |

FOREIGN PATENT DOCUMENTS

| | | |
|---|---|---|
| WO | 2009/053923 A2 | 4/2009 |
| WO | 2009/079447 A1 | 6/2009 |
| WO | 2012/173552 A1 | 12/2012 |

\* cited by examiner

PUMP CONTROL METHOD

CROSS REFERENCE TO RELATED APPLICATIONS

This application claims the benefit of priority under 35 U.S.C. §119 of European Patent Application EP 14 169 568.4 filed May 23, 2014, the entire contents of which are incorporated herein by reference.

FIELD OF THE INVENTION

The invention relates to a pump control method for controlling the operation of a pump system with at least two pump assemblies which are arranged in parallel or in series to one another.

BACKGROUND OF THE INVENTION

Such pump systems for example are to be found in well fields, in which several wells each with at least one pump delivering water in parallel out of the wells are present. The pumps can be taken into operation in different numbers and with a different speed, depending on the required quantity of water.

Moreover, pump systems are known, with which several pumps are connected in series for increasing the pressure. Thereby, the pumps can be operated in a different number or different power depending on the head of the pressure difference to be produced.

If in such pump systems, different types or different sizes of pumps, or pumps with different hydraulic connection conditions are operated together, it is difficult to optimize the operation of the individual pumps such that the desired hydraulic load, which is to say a desired different pressure or flow, can be achieved with minimal energy consumption.

SUMMARY OF THE INVENTION

With regard to this problem, it is an object of the invention, to provide a pump control method as well as a pump system, which permit an energy-optimized operation of several pump assemblies.

According to the invention, a pump control method is provided for the control of the operation of a complete pump system with at least two pump assemblies. The pump assemblies are arranged in parallel or in series to one another. The method comprises the steps of determining a specific total power $E_S$ of the complete pump system which defines a total power in relation to a hydraulic total load of the complete pump system, determining a specific individual power $E_{P,n}$ of each of the pump assemblies which defines an individual power in relation to an individual hydraulic load of the respective pump assembly and computing an individual load factor for each pump assembly according to the equation:

$$E_{gain,n} = \frac{E_S}{E_{P,n}}.$$

The method further comprises adapting the individual hydraulic load of the pump assemblies in dependence on a desired hydraulic load as well as on the computed individual load factor $E_{gain,n}$ of the respective pump assembly.

According to another aspect of the invention, a pump system is provided comprising at least two pump assemblies which are arranged in parallel or in series and a system control comprising one or more control units. The system control is configured to:

set a desired hydraulic total load for the complete pump system;

determine a specific total power $E_S$ for the complete pump system;

determine a specific individual power $E_{P,n}$ of individual pump assemblies, which defines an individual power relative to an individual hydraulic load of the respective pump assemblies;

compute an individual load factor $E_{gain,n}$ for the respective pump assemblies according to the following equation $$E_{gain,n} = \frac{E_S}{E_{P,n}};$$

and adapt a desired individual hydraulic load of the respective pump assemblies in dependence on the desired hydraulic load and on the load factor $E_{gain,n}$.

The pump control method according to the invention is provided for the control of the operation of a pump system with two or more pump assemblies. Thereby, the several pump assembles can be arranged parallel and/or in series to one another. As a rule, a parallel connection is envisaged in order to increase the delivery flow by way of several pumps, wherein the series connection is envisaged, in order to permit a greater increase of pressure by way of several pumps connected one after the other.

According to the invention, a pump control method is now provided, which permits the several pump assemblies to be applied in a particularly energy-efficient manner, which means to say to distribute the necessary hydraulic overall load onto the several pump assemblies such that these are operated in an as energy-efficient as possible manner. The hydraulic total load thereby in the case of a parallel connection is the complete flow of the pump system, whereas the hydraulic total load with a series connection of the pump assemblies is the total pressure difference across the pump system, which means to say the total delivery head of the pump system.

According to the invention, in a first step, the specific total power $E_S$ of the complete pump system is determined. The power thereby is the absorbed power of the complete pump system, which is to say the absorbed power of all pump assemblies which in the pump system are commonly controlled or optimized in the subsequently described manner. In particular, with regard to the power, it is the case of the electrical power which the pump assemblies absorb. The specific total power $E_S$ is determined from the evaluated total power by way of the evaluated toward power being set in relation to the hydraulic total load of the complete pump system. Thereby, as described above, it can be the case of the total flow or the total delivery head. The hydraulic total load can thereby be the hydraulic reference total load or preferably the actually detected hydraulic total load.

In the next step, according to the invention, a specific individual power $E_{P,n}$ of each individual pump assembly of the pump system is determined. For this, the individual power of each pump assembly, which means the individual absorbed power of the pump assembly which is preferably the electrical drive power is detected. This is then set in relation to the individual hydraulic load of the respective pump assembly. The individual hydraulic load, as described, with a parallel connection can be the delivery flow of the individual pump assembly or in the case of a series connection of several pump assemblies can be the delivery head or the differential pressure of the individual pump assembly. The specific individual power $E_{P,n}$ thus forms the relation of the individual power of a pump assembly to its individual hydraulic load.

In a next step and for each pump assembly, an individual load factor $E_{gain,n}$ for each pump assembly is formed from the thus determined specific total power $E_S$ as well as the specific individual power $E_{P,n}$ of each pump assembly, according to the equation $$E_{gain,n} = \frac{E_S}{E_{P,n}}.$$

In the next step, the individual hydraulic load of the pump assembly is adapted on the basis of this thus determined individual load factor, for each pump assembly of the pump system which is to be controlled. This adaptation is effected on the basis of the individual load factor and the desired hydraulic load preferably a desired hydraulic load. This means that the hydraulic load which the individual pump assembly musters is set on the basis of the desired hydraulic load, this means preferably a desired hydraulic overall load whilst taking the individual load factor into account. This means that indeed the individual pump assembly is then not operated with the a determined hydraulic load which would result for a simple arithmetic division of the desired hydraulic total load onto the pump assembly, but with a hydraulic load which is adapted by the load factor $E_{gain}$. The load factor $E_{gain}$ thereby takes into account the energy efficiency of each individual pump assembly and ensures that those pump assemblies with a better energy efficiency are operated preferentially or to a greater part, so that as a whole the energy efficiency of the complete pump system is improved.

According to a first embodiment of the invention, the adaptation of the individual hydraulic load of the pump assemblies is effected in dependence on a desired individual hydraulic load of the respective pump assembly, wherein the desired individual hydraulic load is preferably determined by division of a desired hydraulic total load by the number of active pump assemblies. This means that the desired individual, hydraulic total load is determined by a simple arithmetic division of the total load by the number of present pump assemblies. Subsequently according to this embodiment, whilst taking into account the individual load factor $E_{gain,n}$, then for each individual pump assembly, this previously determined, desired individual hydraulic load is then adapted which means increased or reduced, for each individual pump assembly, for energy optimization, so that a division (distribution) of the hydraulic loads onto the several pump assemblies which is different from the previously carried out simple division results, so that these are operated in an as energy-efficient manner as possible. This means that a greater share of the hydraulic total load is distributed onto particularly energy-efficient pump assemblies.

Further preferably, the adaptation of the individual hydraulic load of each pump assembly is effected by a multiplication of the desired hydraulic load especially a desired hydraulic load by the respective load factor $E_{gain,n}$ or by multiplication of the desired hydraulic load by a variable which is derived from the respective load factor $E_{gain,n}$.

Thus, the load factor $E_{gain,n}$ can be subjected to a mathematic operation for forming a derived variable, or for example multiplied by additional factors or yet exponentiated.

Particularly, with a series connection of the pump assemblies, the adaptation of the individual hydraulic load of each of these pump assemblies is preferably detected by way of multiplication of the desired hydraulic load, in particular the desired individual hydraulic overall load by the square of the respective load factor $E_{gain,n}$.

According to a further preferred embodiment of the invention, the control method functions in a manner such that a pump assembly of the at least two pump assemblies is switched off when the respective individual load factor $E_{gain,n}$ which belongs to this pump assembly, lies below a predefined minimum. Thus, a pump assembly with a lower energy efficiency can be switched off and the total hydraulic load distributed onto pump assemblies with a better energy efficiency.

According to a further preferred embodiment, a pump assembly of the at least two pump assemblies is switched on, when an associated, preferably estimated individual load factor $E_{gain,n}$ which belongs to this pump assembly, lies above a predefined maximum. Thus, a pump assembly which for example was previously switched off according to the method step mentioned above can be switched-on again.

According to a further preferred embodiment, the at least two pump assemblies are arranged parallel to one another, wherein the hydraulic total load of the complete pump system is the flow of the complete pump system and the individual hydraulic load of each pump assembly is the individual flow of the respective pump assembly. Further preferably, the desired hydraulic total load is a desired total flow of the pump system consisting of several pump assemblies arranged in parallel.

According to a further preferred embodiment, the at least two pump assemblies can be connected in series, wherein the hydraulic total load of the complete pump system in this case is the differential pressure across the complete pump system, and the individual hydraulic load of each pump assembly is the individual differential pressure or the individual delivery head across the respective pump assembly. Thereby, the desired hydraulic total load is further preferably a desired total differential pressure or a desired total delivery head. With a multitude of pump assemblies, a combination of pump assemblies connected in parallel and in series can also be used, wherein the control can then be effected in dependence on the flow rate as well as the delivery head.

According to a further embodiment of the control method according to the invention, for a pump assembly which has been switched off, its power, which means its absorbed power, in particular the electrical power before the switching-off is taken into account for the further control. This means that for this pump assembly, as long as it is switched off, the computation of the factors mentioned above is carried out on the basis of the last power before the switching-off. An estimated, individual load factor can thus be formed.

Further preferably, the individual hydraulic load for each pump assembly is regulated (closed-loop controlled), which means to say a control loop is provided for the individual hydraulic load in the pump assembly. The pump assembly for this, in particular can be set in its rotational speed, so that the closed-loop control which is to say the regulation to the desired hydraulic load can be effected by way of speed change. Further preferably, a regulation of the hydraulic total load of the complete pump system is effected alternatively or additionally by an associated control loop.

According to a further preferred variant of the pump control method according to the invention, a measurement value detection of the individual hydraulic load as well as preferably of the power, which is to say the absorbed power of the pump assembly is effected in at least one, preferably in each of the pump assemblies. Thus, one can make do without an external measurement value (reading) detection. The necessary measurement values are preferably detected directly in the pump assembly. Thereby, the hydraulic load, such as the delivery head or the flow can be determined directly or from further variables, in particular electrical variables of the drive motor, as the case may be whilst taking into account additional measurement values. Also necessary sensors can be integrated directly into the pump assembly.

Further preferably, the pump control method according to the invention is designed in a manner such that an evaluation of the specific individual power $E_{P,n}$ of each pump assembly and the computation of the individual load factor $E_{gain,n}$ for each pump assembly is carried out by an individual control unit for the respective pump assembly or by a central control unit for several pump assemblies. The individual control unit can preferably be integrated into the pump assembly itself.

The pump control method according to the invention as well as the one described hereinafter is particularly preferably carried out in a continuous manner during the operation of the pump system. By way of this, an adaptation of the load distribution and thus an optimization of the energy consumption are continuously effected during the operation.

According to a particularly preferred embodiment of the invention, yet a further method step or regulation (closed-loop control) step can be envisaged in the pump control method, said step serving to maintain the distribution of the hydraulic load in predefined regions. Thus preferably, the desired individual hydraulic load of each pump assembly is set in a manner such that the individual hydraulic loads of the at least two, preferably of at least three pump assemblies are in a defined relation to one another. This, in particular, can be advantageous with the application of pumps connected in parallel, such as in well fields, since thus determined mixing ratios between several wells can be ensured despite the previously described optimization of the load distribution. Thus, two superimposed closed-loop controls are provided, specifically on the one hand the load distribution for optimizing the energy consumption and superordinate to this, a regulation which maintains the load distribution in predefined relations to one another. Thus a relation can be defined by the following inequality:

$$b_i > a_{i1} \cdot q_1 + a_{i2} \cdot q_2 + a_{i3} \cdot q_3$$

wherein $b_i$ is a constant which is preferably equal to 0 and $a_{i1}$, $a_{i2}$ and $a_{i3}$ are constants which define the relation of the delivery flows $q_1$, $q_2$ and $q_3$ to one another. This is an example for three pump assemblies. A corresponding inequation could also be devised for several pump assemblies. It is to be recognized that despite the thus defined relations, an optimization window remains, in which the load distribution can be varied for optimizing the energy consumption.

Apart from the previously described pump control method, according to the invention a pump system with at least two pump assemblies is provided, wherein the pump assemblies can be arranged parallel or in series to one another. In this pump system, the pump control method according to the preceding description can be applied, wherein one or more control devices are present, in which the control method is carried out. Inasmuch as this is concerned, the preceding description of the pump control method which can be applied in such control devices is referred to with respect to the design of the pump system and its control devices.

The pump system according to the invention comprises at least one control unit, which is designed for setting the desired hydraulic total load for the complete pump system and for determining a specific total load for the complete pump system. If the pumps are connected in parallel, the hydraulic total load is the total flow, whereas in a series connection the total load is the total differential pressure or the total delivery head of the pump system. With the total power, it is the case of the complete consumed power, in particular the total consumed electrical power of the pump system, which is to say of all pump assemblies belonging to the pump system. Moreover, at least one control unit is provided in the pump system and this unit is designed for determining a specific individual power $E_{P,n}$ of an individual pump assembly which defines an individual power relative to the individual hydraulic load of the respective pump assembly. For this, the individual power, which is to say the consumed individual power, in particular the electrical power is divided by the individual hydraulic load, which is to say, with a parallel connection by the individual delivery flow or with a series connection by the individual differential pressure, for the individual power $E_{P,n}$ of each pump assembly. The control unit is moreover designed to compute an individual load factor $E_{gain,n}$ for the respective pump assembly according to the following equation:

$$E_{gain,n} = \frac{E_S}{E_{P,n}}$$

Moreover, the control unit is designed for adapting a desired individual hydraulic load of the respective pump assembly in dependence on the thus formed load factor $E_{gain}$ and on a desired hydraulic load, in particular the desired individual hydraulic load. For this, as described above, the desired hydraulic load, this means preferably the desired hydraulic overall load, can be multiplied for example by the load factor $E_{gain,n}$ or its square. The above description of the pump control method is referred to with regard to this. All the control units previously mentioned can be integrated into one control unit. Alternatively, it is possible to provide at least two different types of control units, specifically a central control unit which sets the hydraulic total load and determines the specific total power, and local control units which are designed for determining the individual power and for computing the individual load factor $E_{gain,n}$ and for adapting the hydraulic load of each individual pump assembly.

The control unit which is designed for determining the individual load factor and for setting the individual hydraulic load, is preferably assigned to a pump assembly as a local or individual control unit, and is further preferably integrated into this pump assembly. Thus, a decentralized control of the individual pump assemblies is achieved. In particular, measurement values at the individual pump assemblies can be detected in a direct manner and processed in a direct manner.

Particularly preferably, the pump assemblies comprise drive motors which can be set and closed-loop controlled with regard to their speed. Thus, the delivery head or the differential pressure or the volume flow can be changed by way of the speed change. As described above, the pump assemblies can be designed such that they directly detect the flow and, as the case may be the differential pressure, or derive them from electric variables.

The pump system is particularly preferably designed as a well field, wherein individual pump assemblies are assigned to individual wells.

Further preferably, the mentioned control units are designed such that they can carry out one or more of the variants of the pump control methods which are described above.

Particularly preferably, a control unit, in particular a central control unit can be designed such that in a superordinate regulation, it puts the individual hydraulic loads of the at least two, preferably three or more pump assemblies into a predefined relation with one another or maintains the load distribution in a predefined relation to one another. With regard to this too, the description concerning the pump control method is referred to.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
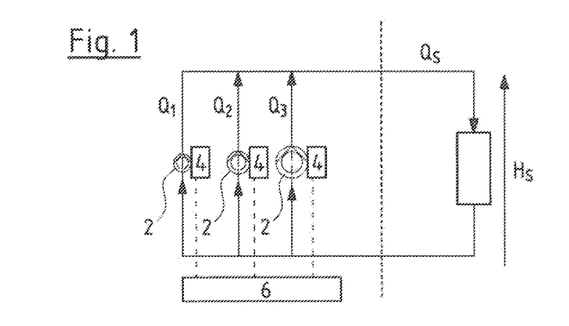
FIG. 1 is a schematic view showing a pump system with several pump assemblies connected in parallel.

Referring to the drawings, the pump control method according to the invention or the pump system according to the invention can be applied in different designs, in particular with a parallel connection and/or series connection of several pump assemblies. FIG. 1 shows an application, in which three pump assemblies 2 are arranged parallel to one another in a circuit. This is a booster application, in which the three delivery flows $Q_1$, $Q_2$ and $Q_3$ of the three pump assemblies 2 add into a total delivery flow $Q_S$. The differential pressure or the delivery head $H_S$ is the same with all three pump assemblies 2. The pump assemblies 2 thereby can be differentially dimensioned as indicated in FIG. 1 by the size.

Figure 2:
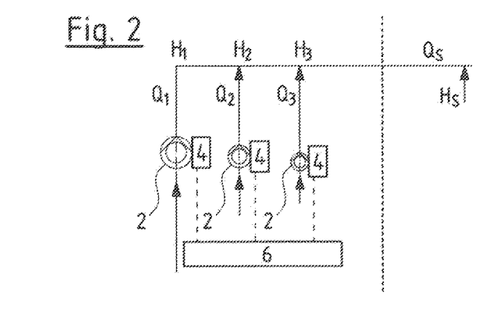
FIG. 2 is a schematic view showing a pump system with several pump assemblies connected in parallel, as is applied in a field of wells.

FIG. 2 shows an arrangement of three pump assemblies 2 which are connected in parallel, but not arranged in a circuit. Such an application is applied for example in a field of wells, wherein the three pump assemblies 2 can be assigned to different wells. Here too, the pump assemblies 2 are differently dimensioned, as is indicated by the different sizes in FIG. 2. With this design, the three pump assemblies 2 have different delivery flows $Q_1$, $Q_2$ and $Q_3$ as well as different delivery heads $H_1$, $H_2$, $H_3$ which sum into a total delivery flow $Q_S$ or a total delivery head $H_S$.

Figure 3:
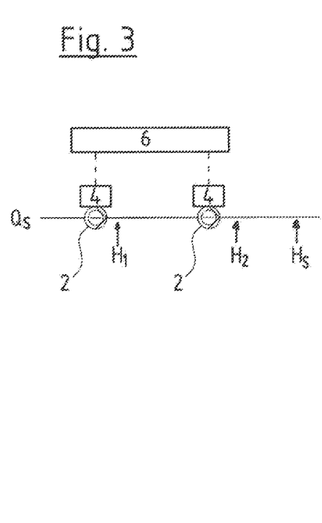
FIG. 3 is a schematic view showing the arrangement of several pump assemblies connected in series.

FIG. 3 shows an application, with which two pump assemblies 2 are connected in series, for example in order to permit a greater pressure increase. The delivery flow $Q_S$ through both pump assemblies 2 is the same, but the delivery heads $H_1$ and $H_2$ of the two pump assemblies sum or add into a total delivery head $H_S$. Here too, the two pump assemblies 2 can be differently dimensioned.

Since the pump assemblies 2 operate differently efficiently due to the different dimensioning of these pump assemblies 2 and the different hydraulic connection conditions, according to the invention, due to a special pump control method, one envisages distributing the complete hydraulic load, which means either the complete delivery flow $Q_S$ or the complete delivery head $H_S$ onto the different pump assemblies 2 such that an as large as possible energy efficiency is achieved. The pump assemblies 2 thereby are electrically driven and each has a local individual control unit 4. Each pump system moreover yet has a central control unit 6 which is signal-connected to the individual control units 4. This can either be effected via electrical or optical signal leads or also via wireless signal connections, as for example radio connections or a powerline communication.

Figure 4:
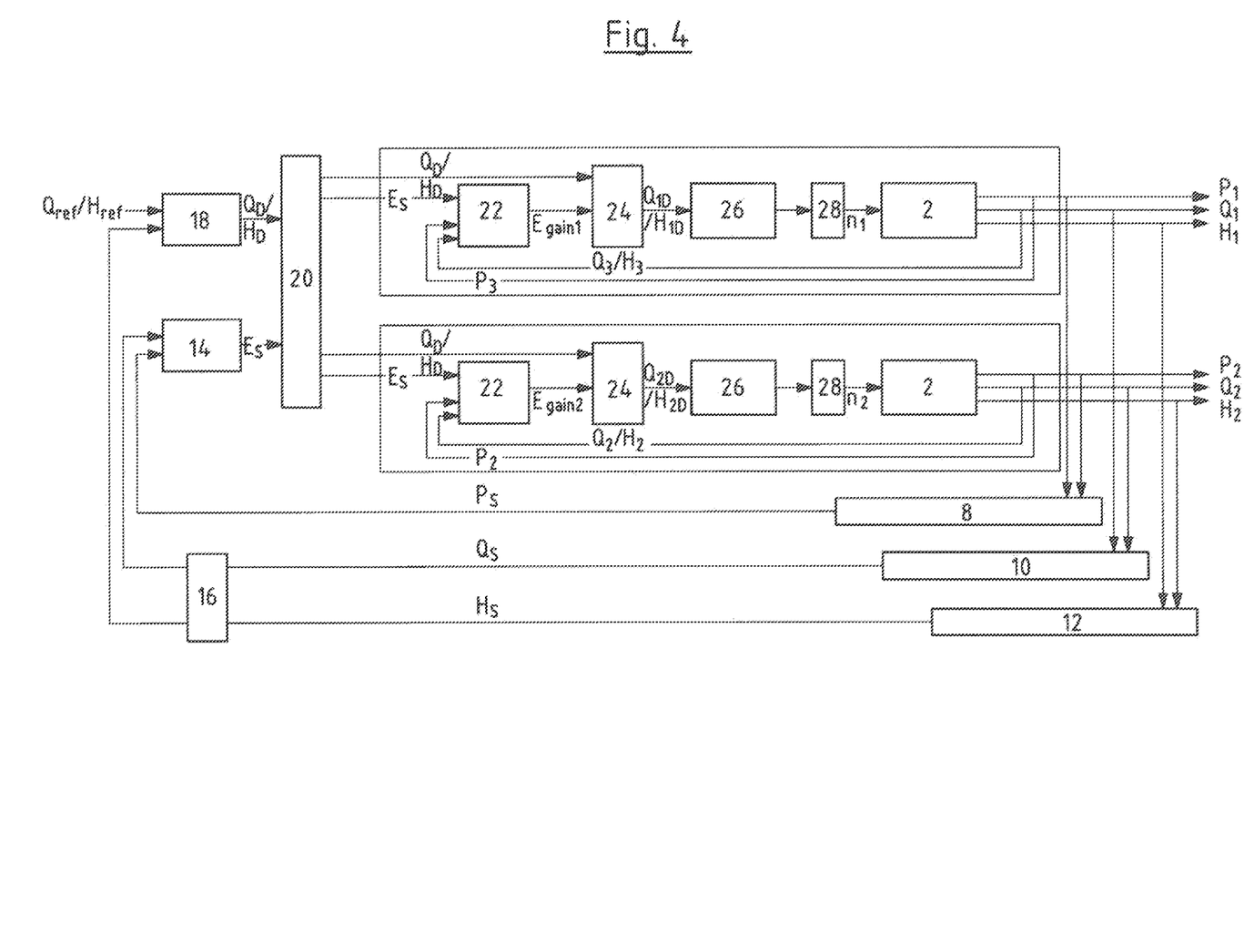
FIG. 4 is a schematic view showing the control or regulation method for adapting the load distribution onto several pump assemblies.

The control method is hereinafter described in more detail by way of FIG. 2. Thereby, parts of the control or regulation, as is shown in FIG. 4 are assigned to the individual control units 4 or are carried out by these, whereas other parts are carried out by the central control unit 6. In FIG. 2 are exemplary shown three pumps with three delivery flows $Q_1$, $Q_2$ and $Q_3$ as well as three delivery heads $H_1$, $H_2$ and $H_3$. In FIG. 2, only two pump with the delivery flows $Q_1$ and $Q_2$ as well as the two delivery heads $H_1$ and $H_2$ are regarded. However, it is to recognize that essentially an optional number of pumps can find use. Therefore, following an index n is used to distinguish an individual parameter of an optional pump. The individual pump assemblies absorb an electrical power $P_n$ and produce a delivery flow $Q_n$ (in FIG. 4: $Q_1$, $Q_2$) as well as a differential pressure or a delivery head $H_n$ (in FIG. 4: $H_1$, $H_2$). The electrical powers $P_n$ (here $P_1$ and $P_2$) or the electrical power consumption of all pump assemblies 2 are summed in the summing module 8 which can be assigned to the central control unit 6. Accordingly, the delivery flow $Q_n$ (here $Q_1$ and $Q_2$), i.e. the hydraulic load of the pump assemblies 2 is summed in the summing module 10. Accordingly the delivery heads $H_n$ (here $H_1$ and $H_2$) as a hydraulic load are summed in the summing module 12. Thereby, it is to be understood that the summing module 10 is applied for summing the delivery flows $Q_n$, in particular with a parallel connection of the pump assemblies 2, whereas the summing module 12 is applied for summing the delivery heads $H_n$ with a series connection of the pump assemblies 2. If the system is envisaged only for one of these applications, then accordingly one of the summing modules 10, 12 can be completely done away with. The necessary variables are preferably detected by the pump assemblies 2 or the individual control units 4 assigned to them, and are transferred to the summing modules 8, 10 and 12 which can be an integral part of the central control unit 6.

The output data, i.e. the sum $P_s$ of the absorbed powers $P_n$ is led from the summing module 8 to the computation module 14, in which a specific total power $E_S$ of the complete system is computed by way of the electrical power being related to the hydraulic load or the total power being divided by the total hydraulic load. In the case of a parallel connection of pumps, the hydraulic load is the total delivery flow $Q_S$ which is issued or outputted from the summing module 10. In the case of a series connection of the pump assemblies 2, the total hydraulic load is the total delivery head $H_S$ which is issued from the summing module 12. One selects between the sums of the summoning modules 10 and 12 via a selection module 16, depending on whether the system is applied to a series connection or a parallel connection. If the system is configured exclusively for one of these applications, then accordingly if one makes do without one of the summing modules 10 or 12, accordingly one can also make do without the selection module 16. The computation module 14 conduce the cost optimization, while the specific total power $E_S$ for the regulation of the total system will be considered.

Either the total delivery flow $Q_S$ or the total delivery head $H_S$ is led to a further computation module 18, likewise at the exit or output side of the selection module. Moreover, at the input side, a reference-delivery flow $Q_{ref}$ or reference-delivery head Href is led as a to reached hydraulic load or hydraulic reference load is led to the computation module 18. The computation module 18 forms a controller for the total delivery flow $Q_S$ or the total delivery head $H_S$ to reach the required hydraulic desired value and releases a desired delivery flow $Q_D$ or a desired delivery head $H_D$ as a desired hydraulic overall load. The desired hydraulic load, i.e. the desired delivery flow $Q_D$ and/or the desired delivery head $H_D$ are led from the computation module 18 to a distribution module 20. Accordingly, the specific total power $E_S$ is led from the computation module 14 to the distribution module 20 which further distributes this data to the individual control units 4 of the individual pump assemblies.

The individual control units 4 in each case comprise a load factor evaluation module 22, in which an individual load factor $E_{gain,n}$ (here $E_{gain,1}$ and $E_{gain,2}$) is formed by way of the division of a specific total power $E_S$ by the specific individual power $E_{P,n}$. The specific individual power $E_{P,n}$ is thereby detected by the respective pump assembly 2, just as the individual hydraulic load in the form of the flow $Q_n$ or the delivery head $H_n$. The individual power $P_n$ is divided by the individual hydraulic load, by which means the specific individual power $E_{P,n}$ is determined. The specific load factor $E_{gain,n}$ is formed in the load factor evaluation module 22 from these input variables on the basis of the formula:

$$E_{gain,n} = \frac{E_S}{E_{P,n}}$$

The load factor $E_{gain,n}$ is led to a load adaptation module 24, in which on basis of the load factor $E_{gain,n}$ and the desired hydraulic load, i.e. on the basis of the desired delivery flow $Q_D$ or the desired delivery head $H_D$ the desired individual delivery flow $Q_{n,D}$ (here $Q_{1,D}$ and $Q_{2,D}$) or the desired individual delivery head $Q_{n,D}$ (here $H_{1,D}$ and $H_{2,D}$) for the respective pump assembly 2 are adjusted. For this, with pumps connected in parallel and which are closed-loop controlled with regard to the flow $Q_n$, preferably the load factor $E^2_{gain,n}$, is multiplied by the desired hydraulic load, i.e. the desired flow $Q_D$. With a series connection, accordingly the desired individual delivery head $H_D$ is multiplied by the square $E^2_{gain}$ of the load factor $E_{gain}$. The hydraulic load is accordingly regulated in the subsequent controller 26 according to the desired individual delivery head $Q_{n,D}$ or the desired individual delivery flow $Q_{n,D}$ on the basis of the flow $Q_n$ (here $Q_1$ and $Q_2$) or on the basis of the delivery head $H_n$ (here $H_1$ and $H_2$) which are actually detected in the pump assembly 2 as feedback. A speed controller 28 which accordingly sets the speed nn of the pump assembly 2 is arranged at the output side of the regulator 26.

On account of the use of the load factor $E_{gain,n}$ which is individually formed for each pump assembly 2, it is ensured that that pump assembly which has the best energy sufficiency, has a greater share of the hydraulic load to be mustered, than a pump assembly 2 which has a lower energy efficiency. The individual control units 4 can moreover be designed such that they completely switch off the pump assembly under certain conditions. This is preferably effected when the formed load factor $E_{gain,n}$ for the respective pump assembly 2 falls short of a predefined minimum. A switching-on again occurs when the individual load factor $E_{gain,n}$ exceeds a predefined maximum or a predefined reference or setpoint again. In the switched-off condition, it is the specific individual power $E_{P,n}$ which prevailed or was measured before the switching-off instead of the actual specific individual power $E_{P,n}$ which forms the basis of the evaluation of the load factor $E_{gain,n}$.

Figure 5:
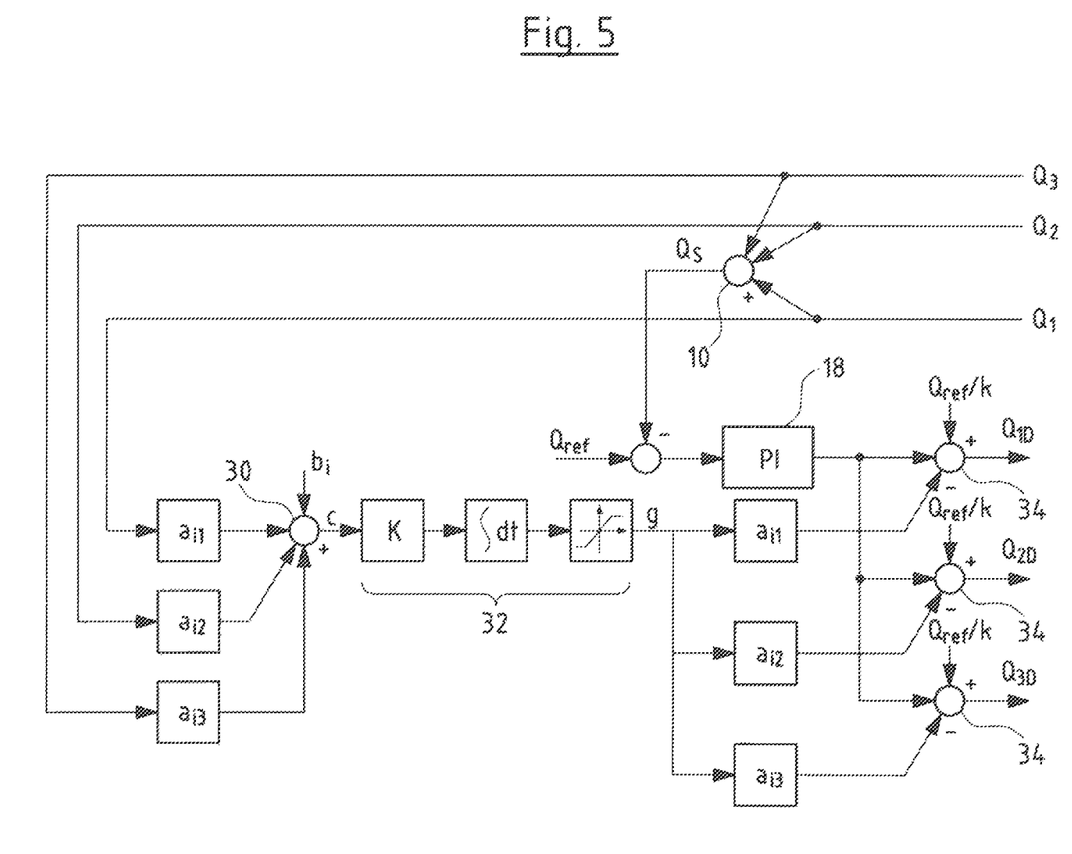
FIG. 5 is a schematic view showing an additional regulation, in order to maintain the distribution of the hydraulic loads in a predefined relation.

An additional regulation which is represented in FIG. 5 can be put on a higher level, in order to be able to ensure that the hydraulic load distribution is effected in defined limits, given several pump assemblies 2, in particular in a well field as is shown in FIG. 2, with pump assemblies 2 connected in parallel. Three pump assemblies 2 which are indicated with the numerals 1-3 are provided in the examples represented in FIG. 5. The portioned load distribution is to be set by the closed-loop control, for example on the basis of the following inequation $b_i > a_{i1}q_1 + a_{i2}q_2 + a_{i3}q_3$. In this formula, $b_i$ is preferably a constant, which is typically 0. $a_{i1}$, $a_{i2}$ and $a_{i3}$ are constants which indicate or define the limits for the mixing ratio.

The flows which are actually produced by the pump assemblies are indicated at $Q_1$, $Q_2$ and $Q_3$ in FIG. 5. These are added in the summing module 10 into the flow $Q_S$, as has been described by way of FIG. 4.

The flow regulation as described by way of FIG. 4 is effected in the controller or computation module 18, wherein the output signal for each of the pump assemblies 2 is added to a feedforward signal $$\frac{Q_{ref}}{k},$$

wherein k is the number of pumps which are in operation and $Q_{ref}$ the set-total flow. Simultaneously, each individual flow $Q_1$, $Q_2$, $Q_3$ is multiplied by a factor $a_{i1}$, $a_{i2}$ and $a_{i3}$ respectively. The thus multiplied signals are added to the constant $b_i$ according to the previously mentioned formula. An adaptation factor g is subsequently determined in a regulation module 32. Thereby, the adaptation factor g is formed depending on the extent to which the inequation in the adder 30 is fulfilled or not. The adaptation factor is multiplied by the constants $a_{i1}$, $a_{i2}$ and $a_{i3}$ and the result is subsequently added in an adder 34 to the feedforward factor $$\frac{Q_{ref}}{k}$$

and to the output of the controller 18, individually for each pump assembly 2. Thus, values for the desired individual delivery flow $Q_{1,D}$, $Q_{2,D}$ and $Q_{3,D}$ are issued as a result and these correspond to the desired individual hydraulic load $Q_{n,D}$, i.e. the desired individual flow $Q_{n,D}$ in FIG. 4. Then according to FIG. 4, the multiplication by the individual load factor $E_{gain,n}$ is effected subsequently in the load adaptation module 34. Thus, simultaneously with the energy optimization, it is ensured that the individual pumps in each case muster a certain share of the hydraulic load or of the flow, or that this share moves within certain limits.

The previously described controller module adders of the control can all be designed as software modules in a computation system.

While specific embodiments of the invention have been shown and described in detail to illustrate the application of the principles of the invention, it will be understood that the invention may be embodied otherwise without departing from such principles.

APPENDIX

List of Reference Numerals

2—pump assemblies
4—individual control units
6—central control unit
8, 10, 12—summing modules
14—computation module
16—selection module
18—computation module
20—distribution module
22—load factor evaluation module
24—load adaptation module
26—controller
28—speed controller
30—adder
32—regulating module
34—adder
$E_{P,n}$—specific individual power of an individual pump
$E_S$—specific total power of the total system
$P_n$—power of an individual pump
$Q_n$—flow of an individual pump
$H_n$—delivery head of an individual pump
$Q_{ref}$—reference flow of the total system
$H_{ref}$—reference delivery head of the total system
$H_D$—desired delivery head of the total system
$Q_D$—desired delivery flow of the total system
$H_{n,D}$—desired individual delivery head
$Q_{n,D}$—desired individual delivery flow
$E_{gain}$—load factor
$n_n$—speed of an individual pump
a, b—constants
g—adaptation factor
$Q_S$—delivery flow feedback of the total system
$H_S$—delivery head feedback of the total system
$P_S$—delivery power feedback of the total system
K—number of pumps in operation

What is claimed is:

1. A pump control method for the control of the operation of a complete pump system with at least two pump assemblies, which pump assemblies are arranged in parallel or in series to one another, the method comprising the steps of:
   determining a specific total power $E_S$ of the complete pump system which defines a total power in relation to a hydraulic total load of the complete pump system;
   determining a specific individual power $E_{P,n}$ of each of the pump assemblies which defines an individual power in relation to an individual hydraulic load of the respective pump assembly; and
   computing an individual load factor for each pump assembly according to the equation $$E_{gain,n} = \frac{E_S}{E_{P,n}};$$

and
   adapting the individual hydraulic load of the pump assemblies in dependence on a desired hydraulic load as well as on the computed individual load factor $E_{gain,n}$ of the respective pump assembly, wherein:
      the step of adapting the individual hydraulic load of the pump assemblies is effected in dependence of a desired individual load of the respective pump assembly;
      the desired individual hydraulic load is determined by division of a desired hydraulic total load by the number of active pump assemblies;
      the pump assemblies comprise at least a first pump assembly and a second pump assembly;
      the individual hydraulic load of the first pump assembly is different from at least the individual hydraulic load of the second pump assembly;
      the specific individual power of the first pump assembly is different from at least the specific individual power of the second pump assembly;
      the individual load factor for each pump assembly corresponds to an efficiency of a respective pump assembly compared to a total efficiency of the complete pump system;
      the first pump assembly has an efficiency that is different from at least an efficiency of said second pump assembly;
      the first pump assembly generates a greater part of the total hydraulic load than at least the second pump assembly;
      the first pump assembly operates at a greater efficiency than the second pump assembly.

2. A pump control method according to claim 1, wherein the step of adapting the individual hydraulic load of each pump assembly is effected by way of a multiplication of the desired hydraulic load by the respective load factor $E_{gain,n}$ or a variable derived from the respective load factor $E_{gain,n}$.

3. A pump control method according to claim 1, wherein the at least two pump assemblies are connected in series and the step of adapting the individual hydraulic load of each of the pump assemblies is further effected by way of multiplication of the desired hydraulic total load by the square of the respective load factor $E_{gain,n}$.

4. A pump control method according to claim 1, wherein one of the pump assemblies of the at least two pump assemblies is switched off when the respective individual load factor $E_{gain,n}$ which belongs to said one of the pump assemblies, lies below a predefined minimum.

5. A pump control method according to claim 1, wherein one of the pump assemblies of the at least two pump assemblies is switched on when an associated, estimated individual load factor $E_{gain,n}$ which belongs to said one of the pump assemblies, lies above a predefined maximum.

6. A pump control method according to claim 1, wherein the that at least two pump assemblies are arranged parallel to one another, wherein the hydraulic total load of the complete pump system is the flow of the complete pump system, and the individual hydraulic load of each pump assembly is the individual flow of the respective pump assembly.

7. A pump control method according to claim 6, wherein the desired hydraulic total load is a desired total flow.

8. A pump control method according to claim 1, wherein the at least two pump assemblies are connected in series, wherein the hydraulic total load of the complete pump system is the differential pressure across the complete pump system, and the individual hydraulic load of each pump assembly is the individual differential pressure across the respective pump assembly.

9. A pump control method according to claim 8, wherein the desired hydraulic total load is a desired total differential pressure.

10. A pump control method according to claim 1, wherein for a pump assembly which has been switched off, a power of the pump assembly which has been switched off, before the switching-off, is taken into account.

11. A pump control method according to claim 1, further comprising at least one of individually regulating the individual hydraulic load for each pump assembly and regulating the hydraulic total load.

12. A pump control method according to claim 1, further comprising effecting a measurement value detection of the individual hydraulic load as well as of the power of the pump assembly in one or in each pump assembly.

13. A pump control method according to claim 1, wherein a determining of the specific individual power $E_{P,n}$ of each pump assembly and the computation of the individual load factor $E_{gain,n}$ for each pump assembly is carried out by an individual control unit for the respective pump assembly or by a central control unit for several pump assemblies.

14. A pump control method according to claim 1, wherein said steps of determining the specific total power $E_S$ of the complete pump system, determining the specific individual power $E_{P,n}$ of each of the pump assemblies, computing the individual load factor for each pump assembly and adapting the individual hydraulic load of the pump assemblies is continuously carried out during operation of the pump system.

15. A pump control method according to claim 1, wherein the desired individual hydraulic load of each pump assembly is set in a manner such that the individual hydraulic loads of the at least two pump assemblies are in a predefined relation to one another.

16. A pump system comprising:
at least two pump assemblies which are arranged in parallel or in series;
a system control configured to:
set a desired hydraulic total load for the complete pump system;
determine a specific total power $E_S$ for the complete pump system;
determine a specific individual power $E_{P,n}$ of individual pump assemblies, which defines an individual power relative to an individual hydraulic load of the respective pump assemblies;
compute an individual load factor $E_{gain,n}$ for the respective pump assemblies according to the following equation $$E_{gain,n} = \frac{E_S}{E_{P,n}};$$

and
adapt a desired individual hydraulic load of the respective pump assemblies in dependence on the desired hydraulic load and on the load factor $E_{gain,n}$, wherein the pump assemblies are settable as to speed and comprise drive motors controlled with a closed control loop, the individual hydraulic load of one of the at least two pump assemblies being different from at least the individual hydraulic load of another one of the at least two pump assemblies, the specific individual power of one of the at least two pump assemblies being different from at least the specific individual power of another one of the at least two pump assemblies, the individual load factor for each of the at least two pump assemblies corresponding to an efficiency of a respective pump assembly compared to a total efficiency of the complete pump system, one of the at least two pump assemblies having an operating efficiency that is greater than at least an operating efficiency of another one of the at least two pump assemblies, wherein the one of the at least two pump assemblies with the greater operating efficiency generates a greater part of the total hydraulic load than at least another one of the at least two pump assemblies.

17. A pump system according to claim 16, wherein the system control comprises individual control units respectively assigned to a pump assembly and integrated into the respective pump assembly for determining the individual load factor $E_{gain,n}$ and for setting the individual hydraulic load.

18. A pump system according to claim 16, wherein the pump system forms a field of wells.

* * * * *